(12) United States Patent
Donahue et al.

(10) Patent No.: US 7,154,515 B2
(45) Date of Patent: Dec. 26, 2006

(54) METHOD AND APPARATUS FOR REDUCING PRINTING ARTIFACTS OF STITCHED IMAGES

(75) Inventors: Joseph P. Donahue, Oro Valley, AZ (US); William A. Hart, Tucson, AZ (US)

(73) Assignee: PerkinElmer, Inc., Wellesley, MA (US)

( * ) Notice: Subject to any disclaimer, the term of this patent is extended or adjusted under 35 U.S.C. 154(b) by 130 days.

(21) Appl. No.: 09/882,138

(22) Filed: Jun. 15, 2001

(65) Prior Publication Data

US 2003/0156122 A1    Aug. 21, 2003

(51) Int. Cl.
*G09G 5/06* (2006.01)
(52) U.S. Cl. ............... 345/686; 345/531; 345/541; 345/565; 345/661
(58) Field of Classification Search ............... 382/284, 382/261; 345/4, 472, 790, 671, 626, 611, 345/686, 565, 531, 541, 661; 358/1.9, 2.1, 358/2.99, 1.12, 1.18
See application file for complete search history.

(56) References Cited

U.S. PATENT DOCUMENTS

| | | | |
|---|---|---|---|
| 4,316,196 A | 2/1982 | Jacobs | 346/1.1 |
| 4,746,942 A | 5/1988 | Moulin | 354/5 |
| 4,912,565 A * | 3/1990 | Yokota et al. | 358/447 |
| 4,924,257 A | 5/1990 | Jain | 355/53 |
| 4,974,073 A | 11/1990 | Inova | |
| 5,130,794 A * | 7/1992 | Ritchey | 348/39 |
| 5,136,390 A | 8/1992 | Inova et al. | |
| 5,255,351 A | 10/1993 | Takanashi et al. | 395/109 |
| 5,270,827 A * | 12/1993 | Kobayashi et al. | 358/3.02 |
| 5,285,236 A | 2/1994 | Jain | 355/53 |
| 5,291,240 A | 3/1994 | Jain | 355/53 |
| 5,600,369 A * | 2/1997 | Cazaux et al. | 348/218.1 |
| 5,631,983 A * | 5/1997 | Ohnishi et al. | 382/284 |
| 5,710,619 A | 1/1998 | Jain et al. | 355/50 |
| 5,721,624 A * | 2/1998 | Kumashiro et al. | 358/450 |
| 5,822,082 A * | 10/1998 | Sato et al. | 358/401 |
| 5,852,674 A * | 12/1998 | Takahashi et al. | 382/167 |
| 5,902,030 A * | 5/1999 | Blanchard | 353/30 |
| 5,946,423 A * | 8/1999 | Takahashi et al. | 382/284 |
| 6,002,492 A * | 12/1999 | Kamon et al. | 358/450 |
| 6,005,649 A * | 12/1999 | Krusius et al. | 349/73 |
| 6,075,905 A * | 6/2000 | Herman et al. | 382/284 |
| 6,084,988 A * | 7/2000 | Kanno et al. | 382/289 |
| 6,115,022 A | 9/2000 | Mayer, III et al. | |
| 6,128,108 A | 10/2000 | Teo | |
| 6,195,471 B1 * | 2/2001 | Larsen | 382/284 |
| 6,205,259 B1 | 3/2001 | Komiya et al. | |
| 6,219,099 B1 * | 4/2001 | Johnson et al. | 348/383 |
| 6,263,118 B1 * | 7/2001 | Kanno et al. | 382/289 |
| 6,389,179 B1 * | 5/2002 | Katayama et al. | 382/284 |

(Continued)

FOREIGN PATENT DOCUMENTS

EP     0 946 042 A2    9/1999

(Continued)

*Primary Examiner*—Kee M. Tung
*Assistant Examiner*—J. Amini
(74) *Attorney, Agent, or Firm*—Carmody & Torrance LLP

(57) ABSTRACT

A method and apparatus for eliminating artifacts in images formed using more than one image segment. A buffer region associated with two adjacent image segments is defined wherein the intensity levels of the pixels are attenuated. When image segments substantially overlap in the buffer region, the intensity in the buffer region substantially sums to full scale. The intensity of the pixels in the buffer region is preferably attenuated using a device to modulate the intensity of the source of radiation.

33 Claims, 3 Drawing Sheets

U.S. PATENT DOCUMENTS

| | | | |
|---|---|---|---|
| 6,470,100 B1* | 10/2002 | Horiuchi | 382/295 |
| 6,522,789 B1* | 2/2003 | Takahashi et al. | 382/284 |
| 6,549,681 B1* | 4/2003 | Takiguchi et al. | 382/294 |
| 6,585,353 B1* | 7/2003 | Kanematsu et al. | 347/43 |
| 6,611,629 B1* | 8/2003 | Bender et al. | 382/278 |
| 6,714,680 B1* | 3/2004 | Sasada | 382/216 |
| 2001/0055430 A1* | 12/2001 | Takahashi et al. | 382/284 |
| 2002/0008675 A1* | 1/2002 | Mayer et al. | 345/4 |
| 2002/0057361 A1* | 5/2002 | Mayer, III et al. | 348/383 |
| 2003/0053708 A1* | 3/2003 | Kryukov et al. | 382/261 |
| 2003/0113034 A1* | 6/2003 | Komiya et al. | 382/284 |
| 2003/0133009 A1* | 7/2003 | Brown et al. | 348/61 |

FOREIGN PATENT DOCUMENTS

EP      0 946 043 A2      9/1999

\* cited by examiner

METHOD AND APPARATUS FOR REDUCING PRINTING ARTIFACTS OF STITCHED IMAGES

FIELD OF THE INVENTION

The present invention is in the field of exposure systems. More particularly, the present invention provides a method and apparatus for combining ("stitching") more than one image segment to produce a larger image without creating a visible seam or other artifacts at the interface between the multiple image segments.

BACKGROUND OF THE INVENTION

Raster output scanning is commonly used in a number of applications, including flatbed scanning recorders, capstan imagesetters and platesetters and even some external or internal drum systems. In a typical flat field imaging application, a photosensitive material, for example, is moved at constant speed by a capstan roller or other linear conveyor means, fed from continuous rolls or precut cassettes of stacked material to present the material to a stationary optical system for scanning. Alternatively, stationary photosensitive material may be imaged by translating the optical system. The scan optic in the flat field imaging context typically consists of a resonating or rotating single facet mirror, or an assembly of two or more mirrors, or a glass prism consisting of one or two reflecting surfaces. It is also common to have a rotating polygon or hologon having multiple reflective or refractive facets symmetric to a central rotating axis.

Within the flat field applications, a rotating polygon scan optic has greater potential for speed and efficiency compared to the use of the resonating scanner or single facet rotary scanner. The polygon scan optic is presently preferred because for each rotation thereof, a polygon scan optic having "n" number of facets produces "n" number of scan lines, whereas for the single facet rotary scan optic or resonating scanner, each revolution of the scan optic produces only one scan line. Thus, to obtain a high resolution image on a given imaging surface in as short an amount of time as possible, it is desirable to maximize the scan rate of the scan optic.

However, in flatbed raster recording systems, such as computer-to-plate systems, technical and cost hindrances limit the practical length of the scan line. This generally limits the page width of these systems to a range of about 6 to about 24 inches.

In an attempt to overcome this page width limitation, efforts have been made, with limited success, to combine the partial scan lines produced by more than one imaging source, or produced by one source at different times, into a single, composite image. For example, it is common to write two or more adjacent pages and mechanically stitch them together. However, it is difficult to precisely butt two printed pages together. As a result, the seams between the partial scan lines produced by each imaging source can be highly visible in the composite image.

Additional artifacts produced by cross-scan errors, pixel size variations, exposure variations and other factors, may also be introduced, further diminishing the quality of the composite image. An undesirable source of error in optical scanning systems results from in-scan error. In-scan error specifically refers to errors in the placement of scan lines in a direction parallel to the lines themselves. Sources of in-scan errors may include variations in the rotational speed of the polygon mirror, pixel timing, clock jitter and mechanical errors such as bearing noise and facet rotational error.

Past attempts to join multiple image segments together have been largely unsuccessful at eliminating a visible seam where the image segments have been joined or have involved complex processing. The present invention incorporates many unique features which eliminate these and other problems associated with the use of multiple image segments to create a single larger image.

In summary, the prior art has yet to disclose or teach singularly, or in any combination, and there continues to be a significant need for, a method and apparatus for combining ("stitching") multiple image segments to form a larger composite image without a visible seam where the image segments have been joined.

SUMMARY OF THE INVENTION

The present invention provides various methods and apparatus for eliminating artifacts in an image formed using more than one image segment. For example, the present invention provides a unique stitching method for eliminating visible seams in the image by creating a first buffer region in a first image segment in which the intensity of the pixels in the first buffer region is attenuated, a buffer region in a second image segment in which the intensity of the pixels in the second buffer region is attenuated, and then overlapping the buffer regions of the two image segments. The present invention provides for the buffer region to be defined as an area of an image comprising a number of pixels from one image segment and a number of pixels from an adjacent image segment. The present invention further provides in a particular preferred embodiment that the intensity of the pixels in the buffer region of each image segment may be attenuated by the use of a device to modulate the intensity of the scanning beam or beams.

BRIEF DESCRIPTION OF THE DRAWINGS

The features of the present invention will be best understood from a detailed description of the invention and a preferred embodiment thereof selected for the purposes of illustration and shown in the accompanying drawings in which.

DETAILED DESCRIPTION OF THE INVENTION

Figure 1:
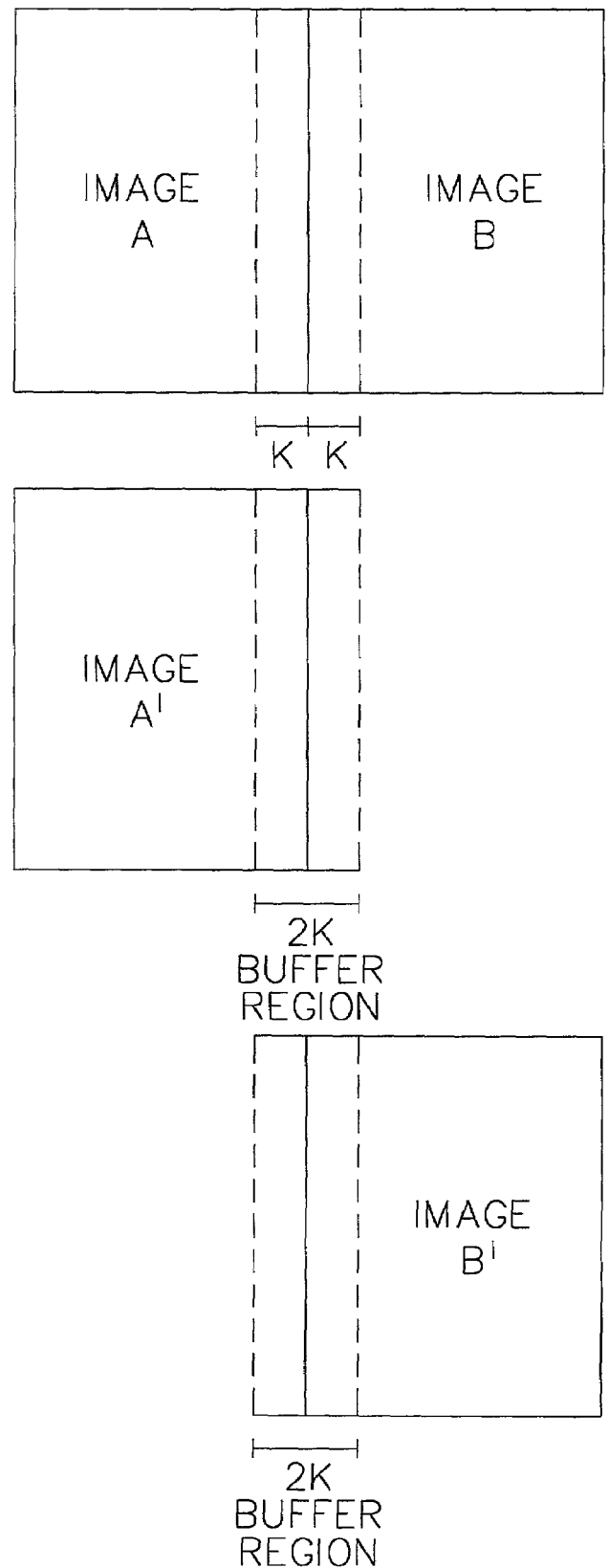
FIG. 1 shows a schematic diagram of two image segments and an exemplary buffer zone on each image segment according to one exemplary embodiment of the present invention.

In a typical flatbed laser raster output scanner, an image is generated by "painting" a two dimensional raster image. One dimension is generated by scanning the laser beam or beams in the "fast scan" (horizontal) direction while the other dimension is generated by more slowly transporting the object or recording medium in a direction orthogonal to the fast scan (vertical or "slow scan"). The source of the printed data is typically generated from a database that is usually arranged in a rectilinear bitmap to be compatible with the raster scanned cathode-ray tube display and usually consists of digital data in binary form, either text or halftone images. In other words, the intensity of any one pixel may only be one of two levels of gray. However, in some cases, data for the raster image may be multi-level data. The exposed object is typically a photosensitive surface such as a printing plate, a xerographic drum, silver-halide film, or other photosensitive coated substrate. Although the present invention is described in the context of an exemplary embodiment, laser raster scanning, the invention would be useful in any system where a pattern of information is being transferred to a sensitive medium. Thus, in the context of the present invention, "printed" or "printing" should be understood as encompassing any method of exposing, scanning, or recording a pattern of information on a sensitive medium.

The image width is limited by the width capability of the fast scan device. To generate an image wider than that produced by the fast scan device, it is common to first expose the photosensitive media surface with an image segment whose size is selected to be equal to or less than the maximum scan width of the fast scan device. Then, either the photosensitive media or the scanning device itself is indexed to the next adjacent recordable area on the photosensitive media. The raster output scanner then prints another image segment, thereby creating a composite image larger than the first image.

For example, to create an exposed printing plate that is X inches wide and Y inches long with a flatbed laser raster output scanner that is X/2 inches wide, one approach is to first expose an X/2 by Y inch segment by raster scanning in the X (fast scan) direction with a scan of X/2 width while translating the plate underneath the operating raster output scanner in the Y (slow scan) direction a distance Y. Next, the slow scan stage is moved to its starting position while the raster output scanner, or the platen holding the printing plate, is indexed by a distance X/2 to the remaining unexposed segment, and the exposure process is repeated. The result is two adjacent butted image segments where the composite image is X inches wide by Y inches long.

Unfortunately, due to mechanical inaccuracies of the scanning system, it is difficult to seamlessly butt the image segments together and the result is often a visible seam artifact that is usually objectionable to the observer. For example, if the slow scan stage that transports the photosensitive plate is not aligned to the fast scan translation, then the butt joints where the image segments are seamed together may be either overlapped or underlapped, creating dark or light areas readily apparent to the casual observer. A typical gap or overlap is usually a fraction of a pixel in width, but can exceed one pixel in systems with poor mechanical tolerances. A gap or overlap of only a fraction of a pixel, even with the smallest pixel sizes, may be sufficient to create a visible artifact in an image. A characteristic size of a pixel may range from a few micrometers to several tens of micrometers.

The present invention in one exemplary embodiment compensates for a seam gap or overlap by digitally filtering the border pixels, in real-time or just prior to exposure, overlapping the adjacent image segments by the spatial width of the digital filter, and printing a hybrid binary/gray scale image to achieve a less objectionable seam. The digital filter is usually effective in one dimension along the fast scan direction, but a two-dimensional filter, i.e. in both the fast scan and slow scan directions, can also be employed.

In order to seamlessly stitch image segments together the following procedure is generally applied. Prior to exposing a first image segment A, the width of image segment A is increased within the digital database by adding a small number of pixels from a second image segment B, adjacent to image segment A. This addition of pixels to image segment A creates a new image segment A'. It should be noted that although the images in the exemplary embodiment of FIG. 1 are the same size and rectangular in shape for ease of explanation, the images may be of different heights and/or widths and do not have to be rectangular in shape, but rather can be of any regular or irregular shape. As shown in FIG. 1, the number of pixels added from the adjacent image segment can be defined by the value K. When image segment A' is printed, most of the pixels of image A' will be scanned unmodified. However, a number of pixels before the border of image segment A', in a region called the buffer region, are scanned with attenuated intensity levels.

First, a buffer region must be defined. The buffer region is normally a rectangular area along the edge of the vertical (slow scan) axis of the image segment to be printed. Although a rectangular area is used for ease of explanation, the buffer region may be of any shape along the vertical axis as is desired to correspond to the border with the adjacent image segment or image segments to be combined, such as sinusoid, slanted, or even irregular, such as to follow the contour of an object shown in an image. As shown in FIG. 1, the buffer region comprises K pixels from image segment B and K pixels from image segment A for a total width of 2K. A buffer region of an equal number of pixels on both image segments was also chosen for ease of explanation. However, it is not necessary for the same number of pixels to be used from both image segments.

The practical width of the buffer region is limited by the width of the scan lens being used or by the integrator being used. A scan lens may limit the width of the buffer region because creating a scan line wider than the scan lens width is not physically possible. An integrator may limit the width of the buffer region based on its word length. An 8-bit integrator, for example, would limit the buffer region to 256 pixels because it can only hold data for 256 pixels at a time. A practical range of widths for the buffer region is presently thought to be between about 8 to about 32 pixels wide although narrower or wider buffers may still function properly. If the buffer region is too wide, too much of the image may be attenuated and the quality of the image may be reduced. If the buffer region is too narrow, too few pixels may be attenuated and a visible seam may still appear.

As image segment A' is printed, a pixel counter 10 keeps track of how many pixels have been exposed. A pixel may be defined as the smallest logical unit on the raster scale of visual information that can be used to build an image. Pixels for the purposes of the exemplary embodiment are about 20 to about 25 microns in size, but, depending upon the exposure application, can vary from a fraction of a micron to tens of microns. The pixel counter is initialized to zero at the beginning of each scan. When the pixel counter reaches the first border of the buffer region, set at a predetermined pixel value, attenuation of image segment A' in its buffer region is triggered.

Figure 3:
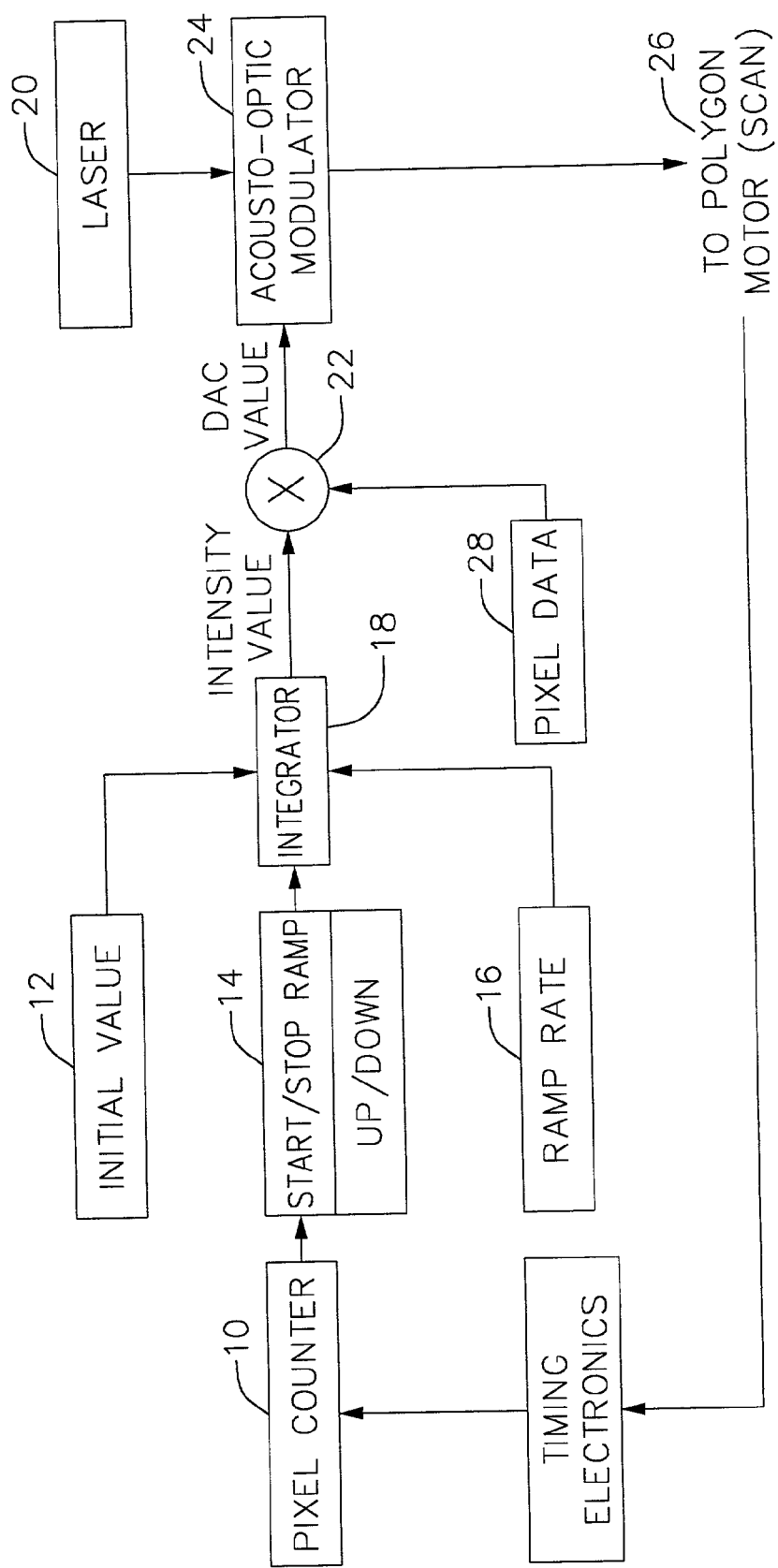
FIG. 3 shows a block diagram general flowchart of one exemplary embodiment of the present invention.

As shown in FIG. 3, upon input from a start-stop switch 14 at a certain pixel value, an initial value 12 and a ramp rate 16 are assigned to an integrator 18. The ramp rate is the rate at which the recording beam intensity will be varied across the buffer region and it is measured in percentage of modulation per in-scan pixel. For example, if the recording beam intensity was to be varied over a buffer region of 32 pixels, the ramp rate is 100%/32. The integrator then calculates an intensity value by integrating the positive or negative ramp rate across the buffer region. The slope of the ramp may be dictated by the width of the buffer region. The intensity value may also be a constant or derived from a look-up table. Non-linear effects may be achieved by adding additional integrators or other non-linear Digital Signal Processing (DSP) type devices. These may consist of delay lines, look-up tables, code generators or other similar devices. Additionally, this technique is not limited to binary data, but can be extended to multi-level data since the essential requirement is to multiply the data value by an attenuation value. A typical integrator used in this invention is an 8-bit integrator which would allow a buffer region of up to 256 pixels.

Normally, a printing plate is exposed with binary, two-level pixels. However, in the buffer region, the printed pixels in one exemplary embodiment of the present invention must possess a gray scale attribute. In other words, their intensities in such an embodiment must be one of more than two levels of gray. The requisite number of gray levels is heuristically determined. Too few levels of gray and the seam filter may be less effective. Too many levels of gray makes the system very complex. The gray scale modulation is typically achieved by amplitude modulation of the recording beam, either externally or internally.

In order to achieve the necessary recording power onto common photosensitive surfaces, often high power lasers or other types of high optical intensity exposure sources are used. In an exemplary embodiment of the present invention, a laser 20 which emits a frequency or frequencies matching the photosensitivity of the printing plates can be used. Since the intensity of some lasers cannot be modified internally, the lasers are typically run in a continuous wave (CW) mode or a quasi-continuous mode and a separate laser beam intensity modulation system is used.

Any electro-optical modulator will achieve a similar effect as the AOM. U.S. Pat. Nos. 4,746,942 and 4,316,196, which provide examples of electro-optic modulators, are hereby incorporated by reference herein.

Also, other means that could be used to generate the required gray levels might include pulse width modulation (PWM) or interference modulation.

Commonly used in laser beam intensity modulation systems are devices called acousto-optic modulators (AOMs). AOMs are beam diffracting devices, which, in an inactivated state, transmit the beam directly through the crystal substrate, referred to as the zero-order beam or light, and when activated by a radio-frequency source, diffract the beam at a known angle, referred to as the first-order beam or light.

In most image recorders using AOMs in the laser beam intensity modulation system, the first-order light from the AOM is used to expose the photosensitive media. In other words, when a given region of the photosensitive media is exposed, the AOM is activated to allow the laser beam to pass through an optical path that leads to the photosensitive media. In an inactivated state, the zero-order light passing through the AOM does not reach the photosensitive media, being dumped outside the optical path.

The use of the first-order light to expose the photosensitive medium works well as a strategy for meeting the exposure requirements of common digital media. The first-order beam provides a very high dynamic range between the light levels of the first-order beam and that relatively insignificant scattering that is transmitted along the optical path when the AOM is inactivated. As a result, there is little clouding of the medium due to incidental exposure of those areas of the photosensitive medium that are intended to not be exposed based upon the image.

Once the intensity value has been computed by the integrator, the intensity value and pixel data 28 from the material to be digitally exposed are entered into a multiplier 22 which converts the data from digital to analog by using a Digital-to-Analog Converter (DAC). DACs are integrated circuits which utilize various techniques to receive a digital data element and produce a corresponding analog voltage.

The DAC outputs an intensity value (a voltage) which drives an AOM 24. A laser beam is directed through the AOM and the AOM controls the intensity of the outgoing laser beam. The AOM and its associated electronic input amplifier are designed to accept any DAC intensity value between and including 0 and 1 volt. At 0 volts, the AOM diffracts substantially 0% of the laser beam and at 1 volt, the AOM diffracts substantially 100% of the laser beam. At any value between 0 and 1 volt, the AOM diffracts a percentage of the laser beam based on the following formula: the intensity out is equal to the intensity in multiplied by the sine squared of the voltage ($I_{out}=I_{in} \sin^2 V$). The voltage into the AOM causes an ultrasonic wave to pass through an optically transparent material which causes periodic variations of the refraction index and diffracts light according to the formula above. An example of an acceptable transparent material for the AOM is crystalline quartz. However, any suitable substitute material possessing acceptable acousto-optic properties will suffice for this purpose.

Any electro-optical modulator will achieve a similar effect as the AOM. U.S. Pat. Nos. 4,746,942 and 4,316,196 which are examples of electro-optic modulators are hereby incorporated by reference herein. Also, other means that could be used to generate the required gray levels might include pulse width modulation (PWM) or interference modulation.

A pulse width modulated output signal from a PWM circuit, typically utilizing a central processor (CPU), comprises a train of pulses at a fixed frequency and having widths proportional to values of data samples. Thus, the PWM output signal may be considered as composed of a baseband signal and a carrier frequency. In order to filter out the carrier frequency from the baseband signal as in a digital to analog application, a low-pass filter is typically connected at the output of the PWM circuit. U.S. Pat. No. 5,255,351, which is incorporated by reference herein, describes a pulse-width modulation device for controlling shapes of dots printed out by a printer by regulating shapes of pulses of PWM signals, which respectively represent gray levels of pixels of an input image.

The presently preferred method of laser intensity modulation in this invention is amplitude modulation (AM) through the use of an Acousto-Optic Modulator. However, laser intensity modulation may be accomplished in a number of other ways, including frequency modulation (FM), phase modulation (PM), or code domain modulation (CDM) techniques. As opposed to amplitude modulation, which directly modifies the intensity of any one pixel, all of these techniques (FM, PM, CDM) modify the average intensity of a set of pixels by means of adjusting when they are turned on. Thus, these methods may be used with binary pixels and there is not a need for pixels possessing a gray scale attribute. When an observer views a printed page from a normal distance, FM, PM, or CDM techniques achieve a blending effect similar to the amplitude modulation process.

FM uses pixel duration timing hardware to change the time of exposure of the pixel within the buffer region. A fast subpixel clock is required, typically 4 to 16 times faster than the main pixel clock. If the pixel is turned on full intensity for X number of pixels, then completely off for X number of pixels, the average intensity would be 0.5. A ramp can be created by varying the On/Off time of the binary subpixels for each pixel in the buffer zone. The effect is very similar to the AM technique, except that in AM, the intensity into the AOM is constant for one pixel and its value can be analog (gray scale), whereas an FM modulated pixel retains a binary amplitude value. An FM ramp function is created by gradually incrementing or decrementing the subpixel time setting versus pixel position.

PM makes use of pixel placement timing hardware to actually vary the pixel position of the last pixel, or last group of pixels, in either a set pattern or a deterministic, quasi-random manner. In PM, the last K pixels on the first line of the first image are essentially being stretched (or shrunk) while the first K pixels of the first line of the second image are being shrunk (or stretched) by making the pixel timing positions slightly closer together. The stretching can be by a fraction of a pixel or by whole pixels. On the second line this could be repeated or reversed (shrinking the pixels on the first image while stretching them on the second). As the scan proceeds down the seam, the end of the left line and the beginning of the right line vary in a deterministic, quasi-random manner. The pattern of shrinking and stretching can be established by a line counter that drives a pattern generator (implemented as a lookup table).

Once the digital data is diffracted by the AOM, the diffracted data travels to a polygon motor 26 where it is sent through a scan lens. The present invention uses non-telecentric scanning although a telecentric scan lens would result in even better artifact reduction. Telecentric scan lenses arc lasers in such a way that the cone of light converging toward focus at a spot in the focal plane is substantially perpendicular to the focal plane for all scan angles. These scan lenses allow the beam to scan normal to the surface of the photosensitive material, rather than at an angle. Scanning at an angle normal to the surface may allow mechanical tolerances of the flatbed and its positioning system to be relaxed. However, for best results, the material should be held as flat as possible. This may be achieved, among other ways, by using a vacuum to hold the material flat against a surface. Image segment A' is printed by the imaging system.

Figure 2:
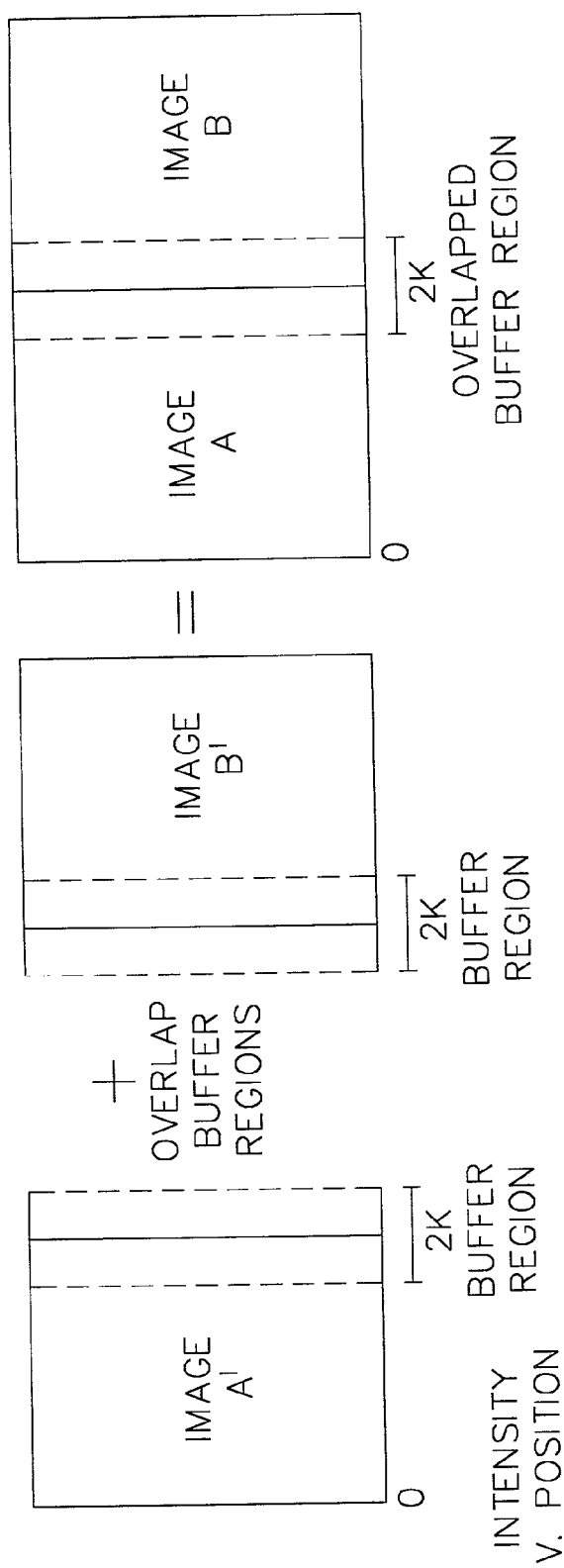
FIG. 2 shows a schematic diagram of intensity versus position for two image segments with buffer zones according to one exemplary embodiment of the present invention.
Figure 2:
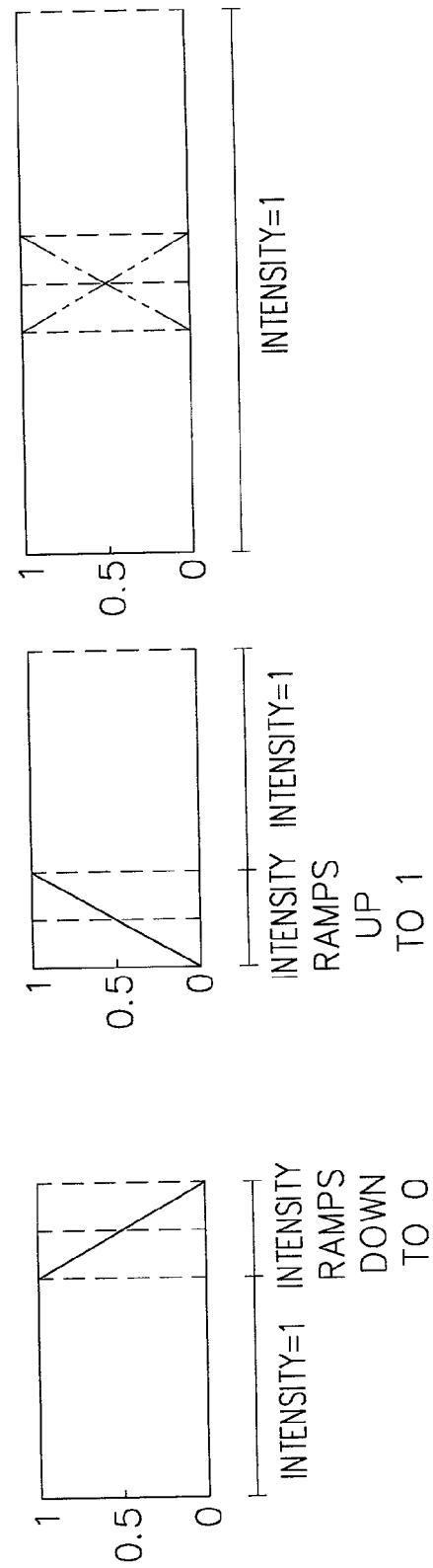

The process articulated above may now be repeated with image segment B'. As shown in FIG. 1, image segment B' comprises the same K pixels from the edge of image segment A as were included in image segment A' and all of image segment B. One change in the process from image segment A' to image segment B' may be that in the buffer region of image segment B', the intensity levels are attenuated in an opposite manner to those in the buffer region of image segment A'. As shown in FIG. 2, the intensity levels in the buffer region of image segment A' may ramp from 1 (full-scale) to 0. On the other hand, the intensity levels in the buffer region of image segment B' may ramp from 0 to 1 (full-scale). Image segment B' now may be printed onto a photosensitive material and the buffer region of B' will in the exemplary embodiment be printed over the buffer region of A'. When the buffer regions are overlapped, the intensity in the exemplary embodiment shown will always substantially be equal to 1 (full-scale). Deviation from full intensity will only occur to the extent the images do not overlap exactly, but any deviation will only occur at a fraction of full intensity. Thus, as shown in this embodiment, the visible seam between the two images will be significantly reduced. The cumulative exposure on the plate is the same as if the pages had been exposed to one wide scan line. The net effect is a higher quality image without a noticeable and objectionable butting artifact.

Although limited embodiments of a stitching method and apparatus have been described and illustrated herein, many modifications and variations will be apparent to those skilled in the art. For example, the intensity of a laser beam is modified in this exemplary embodiment by the amplitude modulation of an Acousto-Optic Modulator. However, the same effect may be reached by modifying the intensity of a set of pixels by frequency modulation, phase modulation, or code domain modulation. In another exemplary embodiment, the buffer region is described as rectangular and comprises an equal number of pixels in both images. However, the buffer region may be of any shape along the vertical axis (e.g. sinusoid, concave, or even follow the outline of an object in an image) and it does not need to comprise an equal number of pixels in each image. Also in an exemplary embodiment, a gas laser is used to scan the material. However, any light or radiation source matched to the photosensitive media and capable of being directed to transfer a pattern of information can be used to achieve the same purpose. Also, rather than a flying spot laser raster scanner, it is possible to expose the same pattern with fixed pattern, multi-element light sources where the intensity of individual emitting elements can be independently modulated, especially in the buffer region, to achieve a reduced butting artifact. The multi-element light source can be an array of laser diodes or light emitting devices, or an array of individually addressed light valves or micro-mirrors illuminated by a light source such as an incandescent light bulb or an arc lamp.

From the foregoing description, it is apparent that many variations and modifications of the above described structures 10 and procedures may be practiced without meaningfully departing from the scope of the invention. Accordingly, the foregoing description should not be read as pertaining only to the precise structures and procedures described, but rather should be read consistent with and as support for the following claims for the fullest and fairest scope.

The invention claimed is:

1. A method for combining at least two adjacent image segments to print a composite image on a photosensitive surface, comprising:
    defining a buffer region as an area of an image to be printed on the photosensitive surface comprising pixels from a first image segment and pixels from a second image segment;
    increasing the width of the first image segment to be printed on the photosensitive surface by adding pixels from the second image segment, wherein the pixels added from the second image segment substantially correspond to the area defined by the buffer region;
    printing, with a printing device, the first image segment and the portion of the second image segment added to increase the width of the first image segment onto the photosensitive surface, while modifying the intensity of the pixels printed in the buffer region by one of an increasing or decreasing first ramp value;
    increasing the width of the second image segment to be printed on the photosensitive surface by adding pixels from the first image segment, wherein the pixels added from the first image segment substantially correspond to the area defined by the buffer region;
    after printing the first image segment, printing, with the printing device, the second image segment and the portion of the first image segment added to increase the width of the second image segment, onto the photosensitive surface, while modifying the intensity of the pixels printed in the buffer region by the other of an increasing or decreasing second ramp value;

whereby the first image segment and the second image segment substantially overlap in the buffer region to form the larger composite image on the photosensitive surface while reducing the visible seam between the first image segment and the second image segment.

2. A method according to claim 1 wherein the ultimate intensity of the pixels printed in the buffer region is substantially the same as the intensity of the pixels printed in the first image segment and the second image segment that are not overlapped in the buffer region.

3. A method according to claim 1 wherein the intensity of the pixels printed in the buffer region sums to substantially full scale.

4. A method according to claim 1 wherein the intensity of the pixels printed in the buffer region is modified by modulating the amplitude of a beam of electromagnetic radiation capable of exposing the photosensitive surface.

5. A method according to claim 1 wherein the intensity of the pixels printed in the buffer region is modified by modulating the amplitude of a beam of light.

6. A method according to claim 1 wherein the intensity of the pixels printed in the buffer region is modified by modulating the amplitude of a laser beam.

7. A method according to claim 6 wherein the amplitude of the laser beam is modified by an Acousto-Optic Modulator.

8. A method according to claim 1 wherein the printing of the first and second image segments is achieved by scanning the photosensitive surface with a rotating polygon scanner, a rotating single facet mirror scanner or a rotating holographic scanner illuminated by the exposing radiation source.

9. A method according to claim 1 wherein the printing of the first and second image segments is achieved by exposing the photosensitive surface using a fixed pattern array of individually segmented light sources.

10. A method according to claim 9 wherein the printing of the first and second image segments uses a laser beam.

11. A method according to claim 9 wherein the printing of the first and second image segments uses light valves illuminated by a light source.

12. A method according to claim 9 wherein the printing of the first and second image segments uses micromirrors illuminated by a light source.

13. A method according to claim 1 wherein the printing of the first and second image segments is achieved by exposing the photosensitive surface using a fixed pattern array of radiation sources.

14. A method according to claim 1 wherein the photosensitive surface is a photosensitive printing plate or a photosensitive printing drum.

15. A method according to claim 1, wherein the width of the first image segment and the second image segment to be printed on the photosensitive surface is loss than or equal to a maximum scan width of the printing device.

16. A printing system capable of creating a composite image comprising at least two adjacent image segments on a photosensitive surface, comprising:

a pixel counter for counting a number of exposed pixels;
an integrator which outputs an intensity value for pixels of a buffer region according to an initial value for the intensity value and a ramp rate that defines a change in the intensity value from the initial value, wherein the buffer region comprises an area of an image to be printed on the photosensitive surface comprising pixels from a first image segment and an adjacent second image segment;
a multiplier which converts digital pixel data and the intensity value into analog data;
an intensity modulator which modulates electromagnetic radiation in accordance with the analog data; and
a printing device which prints the first image segment defined by the electromagnetic radiation onto a first area of the photosensitive surface and, after indexing at least one of the printing device and the photosensitive surface relative to one another, prints the second image segment defined by the electromagnetic radiation onto a second area of the photosensitive surface, wherein the pixels printed in the first image segment and the pixels printed in the second image segment overlap in the buffer region, and wherein the intensity of the pixels printed in the buffer region is modulated in one of an increasing and decreasing value.

17. A printing system according to claim 16 wherein the intensity modulator is an amplitude modulator.

18. A printing system according to claim 17 wherein the amplitude modulator is an Acousto-Optic Modulator (AOM).

19. A printing system according to claim 16, wherein the printing device is a raster output scanner.

20. A printing system capable of creating a composite image comprising at least two adjacent image segments on a photosensitive surface, comprising:

means for counting a number of exposed pixels;
means for computing an intensity value for pixels of a buffer region according to an initial value for the intensity value and a ramp rate that defines a change in the intensity value from the initial value, wherein the buffer region comprises an area of an image to be printed on the photosensitive surface comprising pixels from a first image segment and an adjacent second image segment;
means for converting the intensity value and digital pixel data into analog data;
means for modulating intensity of electromagnetic radiation in accordance with the analog data; and
printing means for printing the first image segment, including the buffer region, defined by the electromagnetic radiation onto the first area of a photosensitive surface and, after indexing at least one of the printing device and the photosensitive surface relative to one another, printing the second image segment, including the buffer region, defined by the electromagnetic radiation onto a second area of the photosensitive surface, wherein the intensity of the pixels printed in the buffer region is modulated in one of an increasing and decreasing value.

21. A printing system according to claim 20 wherein the ramp rate is defined as the percentage of modulation per in-scan pixel.

22. A printing system according to claim 20 wherein the intensity value is computed from a ramp rate and an initial value by an integrator.

23. A printing system according to claim 20 wherein the intensity value and digital pixel data are converted into analog data by a multiplier.

24. A printing system according to claim 20 wherein a means for modulating intensity is amplitude modulation.

25. A printing system according to claim 24 wherein the amplitude modulation is accomplished by an Acousto-Optic Modulator.

26. A printing system according to claim 20 wherein the means for modulating intensity is phase modulation.

27. A printing system according to claim 20 wherein the means for modulating intensity is frequency modulation.

28. A printing system according to claim 20 wherein the means for modulating intensity is code domain modulation.

29. A printing system according to claim 20, wherein the printing device is a raster output scanner.

30. A method of printing a composite image onto a photosensitive surface, wherein the composite image is formed from a first image segment and a second image segment wherein (i) the first image segment comprises a first image segment region, a first first buffer region and a second first buffer region and (ii) the second image segment comprises a second image segment region, a first second buffer region and a second second buffer region and wherein the first image segment is comprised of first image segment pixels and the second image segment is comprised of second image segment pixels, wherein the method comprises the steps of:

printing, with a printing device, the first image segment region, the first first buffer region and the second first buffer region, wherein the first image segment region is formed of first image segment pixels and the first first buffer region and the second first buffer region are formed of pixels of both the first and second image segments and wherein the intensity of the pixels of both the first and second image segments in the first first buffer region and second first buffer region are ramped in intensity in one of an increasing and decreasing value;

after printing the first image segment, printing, with the printing device, the second image segment region, the first second buffer region and the second second buffer region, wherein the first second buffer region overlaps the first first buffer region and the second second buffer region overlaps the second first buffer region, and wherein the first second buffer region and the second second buffer region are formed of pixels of both the first and second image segments and wherein the intensity of the pixels of both the first and second image segments in the first second buffer region and the second second buffer region are ramped in intensity in the other of the increasing and decreasing value;

whereby the first image segment and the second image segment overlap in the buffer regions to form the composite image on the photosensitive surface while reducing the visible seam between the first image segment and the second image segment.

31. The method as claimed in claim 30, wherein prior to printing the first image segment, the method comprises the step of:

in a digital database, increasing the width of the first image segment, which includes the first first buffer region, by the width of the second first buffer region by adding pixels from the second image segment; and prior to printing the second image segment, the method comprises the step of:

in the digital database, increasing the width of the second image segment, which includes the second second buffer region, by the width of the first second buffer region by adding pixels from the first image segment.

32. The method as claimed in claim 31, wherein the first first buffer region and the second first buffer region define a first buffer and the first second buffer region and the second second buffer region define a second buffer, wherein the first buffer and second buffer are created by the steps of:

defining a first rate at which the intensity of the pixels printed in the first buffer and second buffer will be attenuated during printing of the first image segment; and defining a second rate at which the intensity of the pixels printed in the first buffer and second buffer will be attenuated during printing of the second image segment.

33. The method as claimed in claim in claim 32, wherein the first rate and the second rate at which the intensity of the pixels are attenuated are opposite one another, wherein the ultimate intensity of the pixels printed in the buffer regions is substantially the same as the intensity of the pixels printed in the first image segment region and the second image segment region, whereby a composite image, formed on the photosensitive substrate, has a reduced visible seam between the first image segment and the second image segment.

* * * * *

UNITED STATES PATENT AND TRADEMARK OFFICE
CERTIFICATE OF CORRECTION

| | | |
|---|---|---|
| PATENT NO. | : 7,154,515 B2 | Page 1 of 1 |
| APPLICATION NO. | : 09/882138 | |
| DATED | : December 26, 2006 | |
| INVENTOR(S) | : Joseph P. Donahue et al. | |

It is certified that error appears in the above-identified patent and that said Letters Patent is hereby corrected as shown below:

Column 9

Line 20, delete "claim 1" and replace it with --claim 4--

Line 23, delete "claim 1" and replace it with --claim 4--

Signed and Sealed this

Twenty-seventh Day of February, 2007

JON W. DUDAS
*Director of the United States Patent and Trademark Office*